(12) United States Patent
McKay et al.

(10) Patent No.: US 11,501,055 B2
(45) Date of Patent: Nov. 15, 2022

(54) MATHEMATICAL AND SCIENTIFIC EXPRESSION EDITOR FOR COMPUTER SYSTEMS

(71) Applicant: Texthelp Ltd., Antrim (GB)

(72) Inventors: Martin McKay, Belfast (GB); John McGowan, Wellsburg, WV (US)

(73) Assignee: Texthelp Ltd., Antrim (GB)

( * ) Notice: Subject to any disclaimer, the term of this patent is extended or adjusted under 35 U.S.C. 154(b) by 43 days.

(21) Appl. No.: 16/467,230

(22) PCT Filed: Dec. 8, 2017

(86) PCT No.: PCT/EP2017/082095
§ 371 (c)(1),
(2) Date: Jun. 6, 2019

(87) PCT Pub. No.: WO2018/104535
PCT Pub. Date: Jun. 14, 2018

(65) Prior Publication Data
US 2020/0073918 A1      Mar. 5, 2020

(30) Foreign Application Priority Data
Dec. 8, 2016  (GB) .................................... 1620932

(51) Int. Cl.
*G06F 40/111* (2020.01)
*G06F 3/0481* (2022.01)
*G06F 3/0484* (2022.01)

(52) U.S. Cl.
CPC .......... *G06F 40/111* (2020.01); *G06F 3/0481* (2013.01); *G06F 3/0484* (2013.01)

(58) Field of Classification Search
CPC ........ G06F 17/24; G06F 17/25; G06F 40/111; G06F 3/0481; G06F 3/0484; G06T 11/60; A63F 2300/5553; A63F 2300/6623
(Continued)

(56) References Cited

U.S. PATENT DOCUMENTS 5,251,292 A  10/1993  Martel, Jr. et al.
6,064,802 A * 5/2000  Watanabe ............. G06F 40/166
                                                            358/1.11
(Continued)

FOREIGN PATENT DOCUMENTS

EP         1109105 A1    6/2001
WO     2010069132 A1    6/2010

*Primary Examiner* — Ariel Mercado
*Assistant Examiner* — Jenq-Kang Chu
(74) *Attorney, Agent, or Firm* — Porter, Wright, Morris & Arthur, LLP

(57) ABSTRACT

A method of creating a mathematical or scientific expression on a computer system in which a user interface is provided on a computer display device. Input data comprising a string of alphanumeric characters is received from a keyboard. The input data is matched with one or more verbalisations of a mathematical or scientific term. The or each matching term is displayed on the display device. When a user selects one of the displayed matching terms a corresponding graphical symbol is displayed on the display device. The method allows the user to type a verbalised version of the desired mathematical or scientific expression and to have the corresponding mathematical or scientific notation displayed on the display device.

19 Claims, 3 Drawing Sheets

(58) Field of Classification Search
USPC .................. 715/201, 202, 230, 255, 267
See application file for complete search history.

(56) References Cited

U.S. PATENT DOCUMENTS

| | | | |
|---|---|---|---|
| 9,372,828 B2* | 6/2016 | Choe | G06F 17/10 |
| 2006/0005115 A1* | 1/2006 | Ritter | G06F 40/111 |
| | | | 715/215 |
| 2008/0312928 A1 | 12/2008 | Goebel et al. | |
| 2009/0164935 A1* | 6/2009 | Feigenbaum | G06F 40/274 |
| | | | 715/780 |
| 2011/0080409 A1 | 4/2011 | Lee | |
| 2014/0082471 A1 | 3/2014 | Katouli et al. | |
| 2015/0081750 A1* | 3/2015 | Karoji | G06F 15/02 |
| | | | 708/130 |
| 2015/0269115 A1* | 9/2015 | Muraki | G06F 15/0225 |
| | | | 708/130 |

* cited by examiner

MATHEMATICAL AND SCIENTIFIC EXPRESSION EDITOR FOR COMPUTER SYSTEMS

FIELD OF THE INVENTION

The present invention relates to entry of mathematical and scientific expressions to computer systems.

BACKGROUND TO THE INVENTION

Mathematical and scientific expression modules for word processors are known. Such modules conventionally provide a palette of mathematical and/or scientific symbols from which a user can select to create the desired expression in their word processor. For example, if the user wants to type a fraction he firsts selects the Fraction item from the palette and then enters the numerator and denominator. This is effective, but is slow and cumbersome.

It would be desirable to provide an improved mathematical and scientific expression editor.

SUMMARY OF THE INVENTION

A first aspect of the invention provides a method of creating a mathematical or scientific expression on a computer system, the method comprising:

providing a user interface on a computer display device, said user interface comprising an expression entry field and a suggestion display region;

receiving, from a user input device, input data representing a string comprising one or more alphanumeric characters;

matching said input data with data representing one or more verbalisations of a mathematical or scientific term;

displaying, in said suggestion display region, a respective representation of the or each matching term;

identifying a user-selected one of said displayed matching terms; and displaying, in said expression entry field, a graphical symbol or other mathematical or scientific notation corresponding to said user-selected term.
corresponding to said user-selected term.

Preferably said respective representation of the or each matching term comprises a string of alphanumeric characters that provides a verbalisation of the respective matching term.

Preferably said respective representation of the or each matching term comprises a graphical symbol corresponding to said user-selected one term.

Said matching preferably involves matching one or more elements of said input data with said data representing one or more verbalisations of a mathematical or scientific term, wherein the or each input data element represents a letter.

In preferred embodiments said data representing one or more verbalisations of a mathematical or scientific term comprises data representing a string of alphanumeric characters, preferably a string of letters.

In preferred embodiments said user input device comprises a keyboard and wherein said input data is generated by one or more keystrokes on the keyboard. Said matching is preferably initiated when said input data comprises data representing at least two letters. In particular said matching may be initiated when said input data comprises data representing at least two letters corresponding to consecutive keystrokes on the keyboard.

The method typically includes displaying said string in said expression entry field.

Advantageously, the matching involves, in response to not finding a match for said input data, removing data representing a first character of said input data string and then repeating said matching.

The input data is typically stored in an input buffer. Said matching is preferably initiated when said input buffer contains data representing at least two letters. In particular, said matching is preferably initiated when said input buffer contains data representing at least two letters corresponding to consecutive keystrokes.

In preferred embodiments the method includes making a copy of said input buffer, and wherein said matching is performed using the copy of the input data contained in said copy of said input buffer.

Said matching preferably involves, in response to not finding a match for said copy of the input data, removing from said copy of said input buffer data representing a first character in said copy of the input data, and then repeating said matching. Preferably, when said copy of the input data comprises data representing at least two characters, said first character is the character of said at least two characters received earliest during said receiving of said input data. Said first character is typically the character of said copied input data stored earliest in said input buffer.

The preferred method further includes removing from said expression entry field the or each character corresponding to the or each element of the input data matched with said user-selected term.

The method may include performing at least one pre-processing operations before said displaying, in said expression entry field, a graphical symbol corresponding to said user-selected term, wherein said at least one pre-processing operation involves manipulating a cursor of said expression entry field.

The method may include performing at least one post-processing operations after said displaying, in said expression entry field, a graphical symbol corresponding to said user-selected term, wherein said at least one post-processing operation involves manipulating a cursor of said expression entry field.

Manipulating said cursor may involve any one or more of: raising a level of said cursor; lowering a level of said cursor; moving said cursor forward in said expression field; moving said cursor backward in said expression field.

Typically the method includes clearing said input buffer after identifying said user-selected term.

Preferably said matching involves, in response to not finding a match for said input data, performing one or more transform operations on one or more characters of the input data, and then repeating said matching.

Optionally performing one or more transform operations involves replacing one or more characters of the input data with one or more other characters. in the string with one or more other characters, and then repeating said matching.

Said matching may involve, in response to not finding a match for said input data, performing text prediction on the input data, replacing all or part of said input data with corresponding predicted text data, and then repeating said matching.

Said respective representation of the or each matching term may comprise a template or graphical representation of the respective matching term.

Optionally, displaying, in said expression entry field, a graphical symbol or other mathematical or scientific notation corresponding to said user-selected term, involves displaying a user input template corresponding to said user-selected term.

A second aspect of the invention provides a computing device comprising at least one processor and computer-usable instructions executable by said at least one processor to cause said computing device to perform the method of the first aspect of the invention.

A third aspect of the invention provides a computer system comprising a display device, at least one input device and a computing device according to the second aspect of the invention.

A fourth aspect of the invention provides an expression editor comprising computer-usable instructions embodied on computer readable media for causing a computing device to perform the method of the first aspect of the invention.

A fifth aspect of the invention provides an expression editor comprising:
 means for providing a user interface on a computer display device, said user interface comprising an expression entry field and a suggestion display region;
 means for receiving, from a user input device, input data representing a string comprising one or more alphanumeric characters;
 means for matching said input data with data representing one or more verbalisations of a mathematical or scientific term;
 means for displaying, in said suggestion display region, a respective representation of the or each matching term;
 means for identifying a user-selected one of said displayed matching terms; and
 means for displaying, in said expression entry field, a graphical symbol or other mathematical or scientific notation corresponding to said user-selected term.
corresponding to said user-selected term.

Preferred embodiments of the invention allow a user to write mathematical and scientific expressions, for example including equations and formulae, in plain text in response to which the editor suggests matching mathematical and/or scientific terms and/or symbols, and in response to user selection of a suggestion, the editor inserts corresponding graphical notation in an expression entry user interface. Advantageously, the user does not need to know the graphical notation, or hunt for it on a graphical palette. The preferred editor displays the words that match the user's input text and the corresponding graphical symbol.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Referring now to FIGS. 1A to 1E of the drawings there is shown a series of representations of a computer user interface 10 illustrating how a mathematical expression 12E is created using an expression editor 20 (FIG. 3) embodying a first aspect of the invention. In FIGS. 1A to 1D the mathematical expression 12E is shown in respective stages of creation as 12A, 12B, 12C and 12D. It will be understood that the expression 12E is exemplary only, and that embodiments of the invention may be used to create any supported mathematical or scientific expression.

Figure 3:
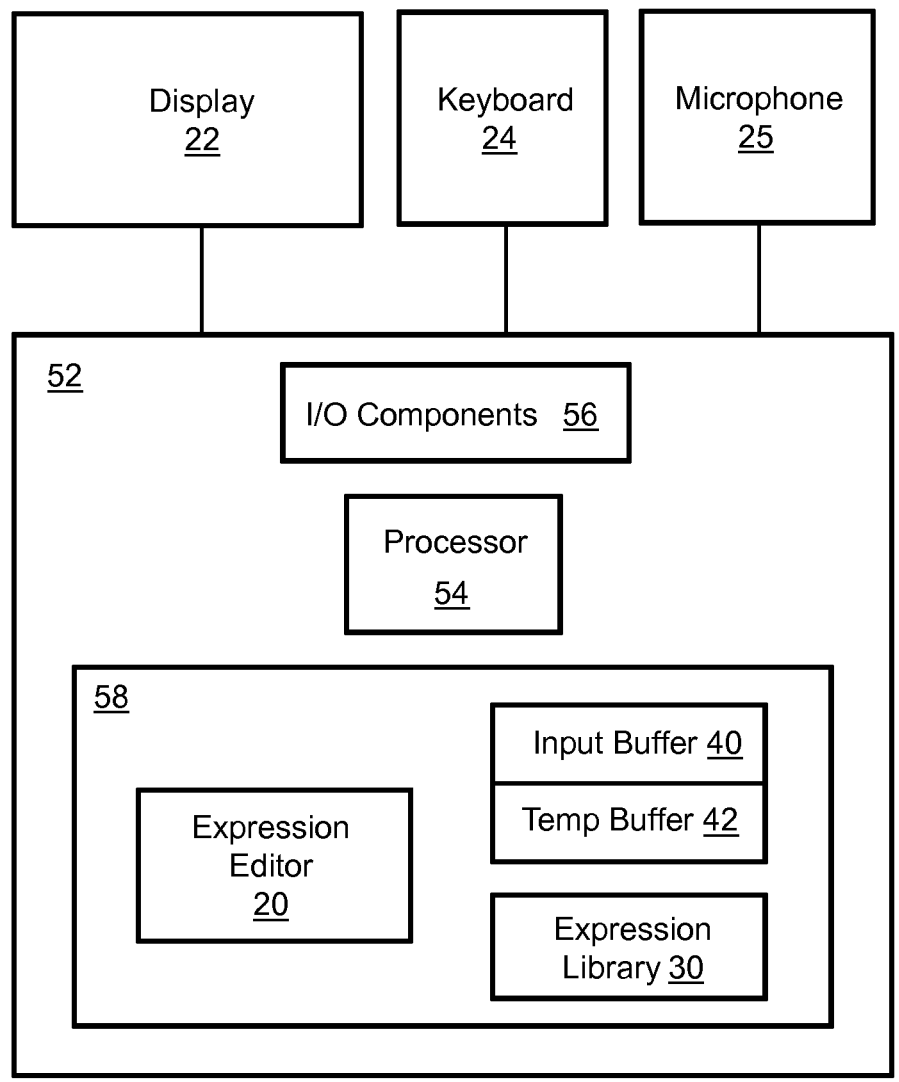
FIG. 3 is a schematic diagram of a computer system embodying another aspect of the invention, the computer system including the expression editor of the first aspect of the invention.

The computer user interface 10 is supported by the expression editor 20 comprises a display area 14 that is displayed in use by a computer display device 22 (FIG. 3). The interface 10 provides, in the display area, an expression entry field (or box) 16 and a suggestion display region 18. The expression entry field 16 (or editing area), which typically includes a cursor 17, enables a user (not shown) to input alphanumeric text to the expression editor 20 using an input device, typically a computer keyboard 24 (FIG. 3) and/or a microphone 25 (FIG. 3) and/or other input device. The expression editor 20 is configured to display in the suggestion display region 18 one or more suggested mathematical or scientific terms 15 that it predicts based on the user input to the expression entry field 16. The suggestions preferably comprise a verbalisation of the suggested mathematical or scientific term, i.e. an expression of the mathematical or scientific term in one or more words (in whichever natural (or ordinary) language supported—embodiments of the invention may be configured to support one or more natural languages as desired). Alternatively, or in addition, the suggestions may comprise a graphical symbol associated with the suggested mathematical or scientific term. The suggested mathematical or scientific terms may comprise, for example, terms of mathematical or scientific operations, names or entities or any other term used in mathematical or scientific equations or formulae. Terms are displayed in the suggestion display region 18 in any conventional manner that allows them to be selected by the user using a conventional input device, e.g. using a keyboard, pointer device or a touch sensitive screen.

Advantageously, embodiments of the invention enable the user to input a mathematical or scientific expression in a verbalised form, i.e. comprising one or more letters or words. In the case where the input device is the keyboard 24 this involves typing one or more relevant letters or words. In the case where the input device comprises a microphone 25, this involves speaking one or more relevant words. In embodiments where the input device comprises a microphone, a further input device (not shown) is typically required to enable the user to select suggestions presented by the editor 20. The further input device may be the keyboard 24, or a pointer device (not shown), e.g. a computer mouse, joystick, or a touch screen or touch pad. Alternatively the further input device may be provided by the microphone operating in a suggestion selection mode rather than an expression input mode, each mode being supported by the editor 20.

The mathematical or scientific expression to be input by the user may comprise different types of element. For example it may comprise one or more mathematical or scientific terms (e.g. a mathematical operation or entity, or a scientific operation or name, for example the name of a chemical), and/or one or more numerals and/or one or more variables (typically representable by one or more letters or other characters or symbols). Some elements of the expression may be input directly by one or more keystrokes of the keyboard 24. This type of element may include numerals or variables represented by letter(s) or symbols that are assigned to one or more keystrokes of a keyboard, and typically comprises one or more alphanumeric characters, mathematical symbols (e.g. +. − or =) or Greek letters). Other elements are not amenable to such direct input but may nonetheless be input using the keyboard 24 by verbalisation of the term. For example the mathematical term square root can be input by typing square root. Some terms may be capable of verbalisation in more than one way and preferred embodiments are configured to support this. For example the mathematical term ¾ may be entered by typing three quarters or three over four. Supported alternative verbalisations may include misspelling(s) of the term. The preferred editor 20 therefore supports entry of expression elements in a verbalised form, typically comprising plain text, and in particular letters and/or words, which may conveniently be entered using the keyboard 24. In alternative embodiments, any of the element types may be entered by speaking an appropriate verbalisation into the microphone 25. Some embodiments may support expression entry using either a keyboard, or a microphone or both.

As the user inputs the expression the expression editor 20 matches the input with one or more mathematical or scientific terms that are stored in an expression library 30 (which may be computer-implemented in any convenient manner using, for example, computer memory, look-up table(s) and/or database(s)). In the case of keyboard entry, the expression editor 20 performs a matching process as the keystrokes are being made in order to predict the term that is being entered. Therefore, as the user begins to type a word, e.g. cubed, that is a verbalisation of a term in the expression being entered, he may reach only part-way through typing the word before the editor 20 makes a prediction of what is being typed and presents one or more suggestions to the user in the display region 18.

The expression library 30 contains at least one entry for each of a plurality of mathematical and/or scientific terms. In cases where the mathematical or scientific term has more than one supported verbalisation, the expression library 30 may include a respective entry for each supported verbalisation of the term. Each entry is associated with at least one string of at least one alphanumeric characters (typically comprising plain text, and in particular letters) to enable the entry to be matched to an input string typed by the user, each string corresponding to a verbalisation of the respective term. For terms that are capable of being verbalised in more than one way, a respective entry may be provided for each supported verbalisation or a single entry may be provided for each term, each single entry being associated with a respective string for each verbalisation that is supported by the editor 20. Each string may be associated with more than one term in the library 30.

Each entry in the expression library 30 typically comprises data representing at least one character string (typically comprising plain text, and in particular letters) that is a verbalisation of a respective mathematical or scientific term (e.g. square root). The character string data may conveniently be used for the matching process by comparison with the input string provided by the user. Each entry may also comprise (or be linked with) data representing a graphical symbol for the term, e.g. √, or more than one graphical symbol relating to the term, and/or one or more graphical representation of the term, and/or data representing a character string for a mathematical or scientific notation for the term (e.g. SO4 for "sulphate", or ( ) for "parentheses" or "brackets", or $\_.\_\times 10^-$ for "scientific notation"). The term entry data may take any convenient conventional form, for example ASCII, UNICODE, LaTeX or other code as applicable. Typically, the data comprises a respective element for each character.

Each entry in the expression library 30 may comprise, or be linked with, data representing one or more phrases associated with the respective mathematical or scientific term. The phrase may be a verbalisation of all or part of the respective term, e.g. cube root or times. The data may take any convenient conventional form, for example ASCII, UNICODE, LaTeX or other code as applicable Each entry in the expression library 30 may comprise, or be linked with, data representing one or more templates associated with the respective mathematical or scientific term, wherein each template may include one or more field for population by subsequent data entry by the user, i.e. a data input template. For example, for the expression "scientific notation", there may be a template $\_.\_\times 10^-$ where the underscores represent fields to be populated with user input data. The template(s) may be implemented in any convenient manner, e.g. using HTML, or other suitable computer language or code. The template may include one or more graphical symbols as required.

When the user enters a valid character it is added to an input string (and preferably displayed in the expression entry field 16) and the editor 20 searches the expression library 30 to match the current input string with one or more term entries held in the library 30. Typically, the input string is matched to the part of the entry that comprises data representing at least one character string. The editor 20 may be configured to use any conventional matching and/or algorithm(s) for this purpose. The editor 20 may cause data from the, or each, matching term entry that is found to be presented to the user in the suggestion display region 18. The presented data from the term entry may represent a character string (typically comprising plain text, and in particular letters) that is a verbalisation of a respective mathematical or scientific term (e.g. square root) and/or may represent a graphical symbol for the term, e.g. √, or more than one graphical symbol relating to the term, and/or one or more graphical representation of the term and/or may represent a character string for a mathematical or scientific notation for the term (e.g. SO4 for sulphate, or ( ) for "parentheses" or "brackets", or $\_.\_\times 10^-$ for "scientific notation"). The presented data may be obtained from any suitable part(s) of the relevant library entry. For example, the presented data may be obtained from the part of the entry that comprises data representing at least one character string (and which is used for matching) and/or from the graphical symbol data and/or the graphical representation data, and/or the phrase data and/or the template data. The term entry data may take any convenient conventional form, for example ASCII or UNICODE or LaTeX, as applicable. Typically, the data comprises a respective element for each character. It will be understood that when such data is presented to the user in the display region 18 it is displayed as the relevant character string or symbol or other graphical representation rather than as the code.

In preferred embodiments the editor 20 performs the searching, or matching process, only when the current input string contains at least two characters. This is because, for example, a single letter may represent a variable rather than being the beginning of a verbalisation of a term. For example the editor may begin the matching process when it determines that the stored input string does not consist of a single letter.

When the user selects a term presented in the suggestion display region 18 the editor 20 causes the corresponding graphical symbol or other corresponding mathematical or scientific notation to become part of the expression being created and to be displayed in the expression entry field 16 (in place of the respective displayed input string). To this end, each term entry in the expression library 30 includes, or is linked to another library containing, data defining the respective graphical symbol(s), and/or graphical representation and/or template and/or character string for the respective mathematical or scientific notation. The term entry data may take any convenient conventional form, for example ASCII or UNICODE, HTML or LaTeX, as applicable. It will be understood that when such data is presented to the user in the expression entry field 16, it is displayed as the relevant character string or symbol or other graphical representation rather than as the code. When a suggested term has been selected by the user from the selection display region 18 and displayed in the entry field 16, the input string that is used for the matching process is reset and a new string is created based on the subsequent user key strokes. Similarly any character(s) (typically letters) that are displayed as part of the expression in the entry field 16 and which correspond to the input string that was used to make the selected match are removed from the expression displayed in the field 16 and replaced with the corresponding graphical symbol or other corresponding mathematical or scientific notation. Any user input that has already been accepted by the editor 20, e.g. either as a result of the user selecting a displayed suggestion or because the relevant character(s) was deemed to be a direct entry (for example a numeral or a variable), may be stored by the editor 20 in any convenient conventional manner.

The example of FIGS. 1A to 1E illustrates how the user can input a mathematical expression as a typed verbalisation of the expression in response to which the editor 20 displays the corresponding expression using mathematical notation based on suggestion selections made by the user. In this example it is assumed that the user inputs the expression using the keyboard 24 to type a verbalisation of the expression comprising one or more words, one or more numerals and, if applicable, one or more mathematical variables, each comprising one or more alphanumeric characters created by keystrokes on the keyboard 24. It is noted that while the user may begin to type a word, he may only get as far as typing part of the word, i.e. one or more letters, before the editor 20 makes a prediction(s) for the user to select.

Figure 1:
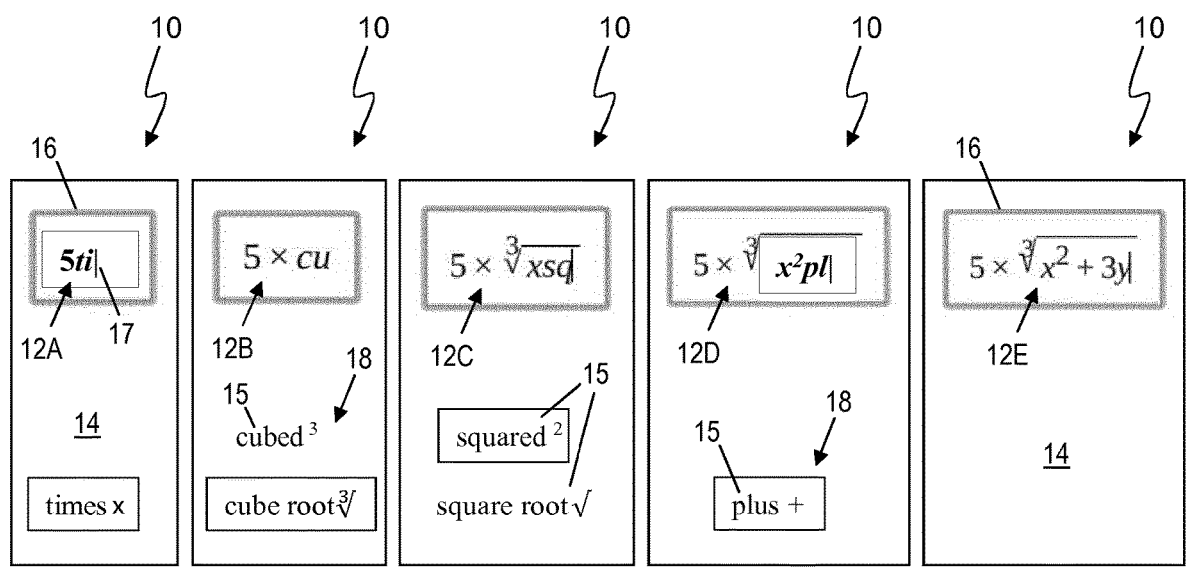
FIGS. 1A to 1E are representations of a user interface supported by an expression editor embodying a first aspect of the invention, illustrating how a mathematical expression may be created by a user.

In the example of FIGS. 1A to 1E it is assumed that the user wishes to create the mathematical expression 12E shown in FIG. 1E. To begin with the user types the numeral 5, which is displayed in the expression entry field 16. In preferred embodiments numerals are accepted as a direct input and excluded from the input string, i.e. ignored for the matching process. The editor 20 does not display any predicted suggestions in response (because the entered character is a numeral but also in this case because there is only one character in the input string). Next the user begins to type a verbalisation of the mathematical term for multiplication, which in this example is the word times, although it may alternatively be the words multiplied by. Each character is displayed in the entry field 16 as it is typed and added to the input string. When the first two characters of time have been typed and displayed, the editor 20 finds a match in the expression library 30 and displays the verbalisation times in the suggestion display region 18 together with the corresponding symbol X (FIG. 1A). The user selects the prediction times X (selection being indicated by the box around times X). In response, the editor 20 removes the characters ti from input string and replaces them with the symbol X, which is displayed in the expression entry field 16 (FIG. 1B). The editor 20 resets the input string and creates a new one as the user continues to type. The input accepted by the editor 20 at this stage is 5X, which is also what is displayed in the entry field 16. In this example it is assumed that the user now begins typing the words cube root. When the user types the letter c, the string 5X c is displayed in the entry field 16 but the editor makes no predictions since the input string used for matching purposes contains only the letter c, which could be intended as a variable. Next the user enters the letter u, making the input string consist of cu, in response to which the editor 20 finds two matches in the expression library 30, namely cubed and cube root. The matching terms are displayed in the suggestion display region 18 while the expression in the entry field 16 now comprises 5X cu (FIG. 1B). The user selects cube root. The letters cu are removed from the displayed expression and replaced with the symbol for cube root (FIG. 1C). The input string is reset and the user continues to type. The next letter typed is x, which is added to the input string and displayed in the entry field 16. The editor 20 makes no predictions because there is now only one letter in the input string, i.e. x. The user now begins to type the term "squared". When the user types s, the input string consists of xs, which is displayed in the entry field 16 but for which the editor 20 does not find a match in the library 30 and so does not make any predictions. When the user has typed sq, the user input now consists of xsq, for which no match would be found if this string were the input string. This is because the x is intended as a variable. To prevent this becoming a problem, when an input string has more than one character (in particular letters) and the editor 20 can find no match for it in the library, the editor 20 removes the first character from the input string. The removed character is accepted by the editor 20 as input on its own and its display in the entry field 16 is maintained, e.g. it is assumed to be a variable. In the present example the x is removed and the input string consists of sq for which the editor 20 finds two matches in the expression library 30, namely squared and square root. The matching terms are displayed in the suggestion display region 18 and the user selects squared. The letters sq are removed from the displayed expression and replaced with the symbol for squared (FIG. 1C). The input string is reset and the user begins to type the word plus. When the user has typed pl, the editor 20 finds a match, namely plus, in the library 30 and presents this to the user in the suggestion display region 18 (FIG. 1D). The user selects plus. The letters pl are removed from the displayed expression and replaced with the symbol for plus (FIG. 1E). The user then completes the expression by typing 3y.

Optionally, if no match for the input string can be found, the editor may perform one or more transform operations on the characters of the input string. One example of a transform operation is to replace one or more characters in the string with one or more other characters, and then to repeat the matching process. For example, characters, in particular letters, may be replaced with one or more characters that they are commonly confused with (e.g. "b" and "d"), or with characters that they appear next to on a keyboard, or with one or more phonetically equivalent characters. To this end, a transform engine (not shown) may be provided and configured to perform one or more character replacement rules on the input string (or on a previously transformed input string) in order to produce a transformed input string. Typically the editor sends the input string to the transform engine, receives a transformed string and performs the matching process on the transformed string.

Alternatively or in addition, the input string may be provided to a predictive text engine, and the editor may replace all or part of the input string with a corresponding transformed string provided by the predictive text engine. The matching process is repeated once all or part of the input string has been replaced with a corresponding predicted text data provided by the predictive text engine. Any conventional predictive text engine (not illustrated) may be provided and used for this purpose. These transform operations can be performed before and/or after the procedure described above whereby the first character in the input string is removed if a match is not found.

Although the expression 12E shown in FIG. 1E is a mathematical expression, embodiments of the invention may also support the creation of scientific expressions, e.g. "Sul" could predict "Sulphate—SO4" in chemistry notation for preparing chemical equations and formulae. More generally the expressions created by the editor 20 comprise a string of characters that may include graphical computer representations of symbols belonging to a mathematical and/or scientific notation together with alphanumeric characters, and/or one or more templates corresponding to all or part of a mathematical and/or scientific notation. In this context it will be apparent that such mathematical and scientific symbols are not alphanumeric characters. In any event, the user is able to input a mathematical or scientific expression as a typed or spoken verbalisation of the expression in response to which the editor 20 displays the corresponding expression using mathematical or scientific notation as applicable.

In embodiments where the editor 20 accepts user inputs from the microphone 25, the editor 20 may include or be co-operable with a voice recognition module (not shown). Once a term is recognised by the editor 20 it looks the term up in the library 30 and presents the or each matching term to the user in the manner described above.

It will be apparent that, in preferred embodiments, the editor 20 is able to recognise plain text input by the user and to predict one or more corresponding complete plain text word, preferably along with a corresponding graphical symbol, and then to enter the graphical symbol into the entry field 16 in response to selection by the user.

Depending on which term is selected by the user from the suggestion display region 18, the editor 20 may perform one or more pre-processing before adding a mathematical or scientific symbol or template to the expression in the entry field 16, and/or one or more post-processing operations adding a mathematical or scientific symbol or template to the expression in the entry field 16. The pre-processing and/or post-processing may involve manipulation of a cursor in the entry field. For example the entry field 16 may have a baseline cursor level for displaying characters or symbols, a superscript cursor level (raised with respect to the baseline) and/or a subscript cursor level (lower than the baseline). The editor 20 may change the cursor level before and/or after inserting a character or symbol into the entry field 16. In some cases, e.g. when inserting the superscript for "squared" or "cubed", this may involve changing the cursor level prior to insertion and then returning it to the original level after insertion. Cursor level manipulation may be performed not only in respect of the current location in the entry field 16, but also in one or more previous location and/or one or more future locations (i.e. forwards and backwards in the field 16). For example, if the user enters a fraction by typing 4 over 5, the editor 20, upon matching over with the term "divided by" may replace, say, the letters ov with the symbol /. The editor 20 may then change the level of the "4", which is displayed at the previous cursor position to a superscript level, and may subsequently change the level of the "5", which will be in the next cursor position to a subscript level. Alternatively, or in addition, the manipulation of the cursor may involve changing the cursor location forwards and/or backwards in the entry field 16. For example, in cases where the editor 20 supports entering a fraction in a single cursor location, it changes the cursor location for the divide symbol and the denominator so that they are displayed in the same cursor location as the numerator (this processing would typically also involve changing the cursor levels for the numerator and denominator as described above).

Hence, the pre-processing and post-processing may be performed by causing the editor 20 to perform one or more relevant operations with respect to the cursor. Each operation typically corresponds to one or more respective keystrokes (e.g. the keystroke(s) for backspace, forward space, superscript or subscript) and so the editor 20 may be caused to emulate the relevant keystrokes. Each library entry may include data defining any pre-processing or post-processing that is required for the respective term, and may also include an indicator that pre-processing or post-processing is required for that term.

Optionally the editor 20 may be configured to employ machine-learning (any convention machine learning technique(s) may be used) to predict an expression being entered or to be entered by the user based on one or more previously entered expressions.

Figure 2:
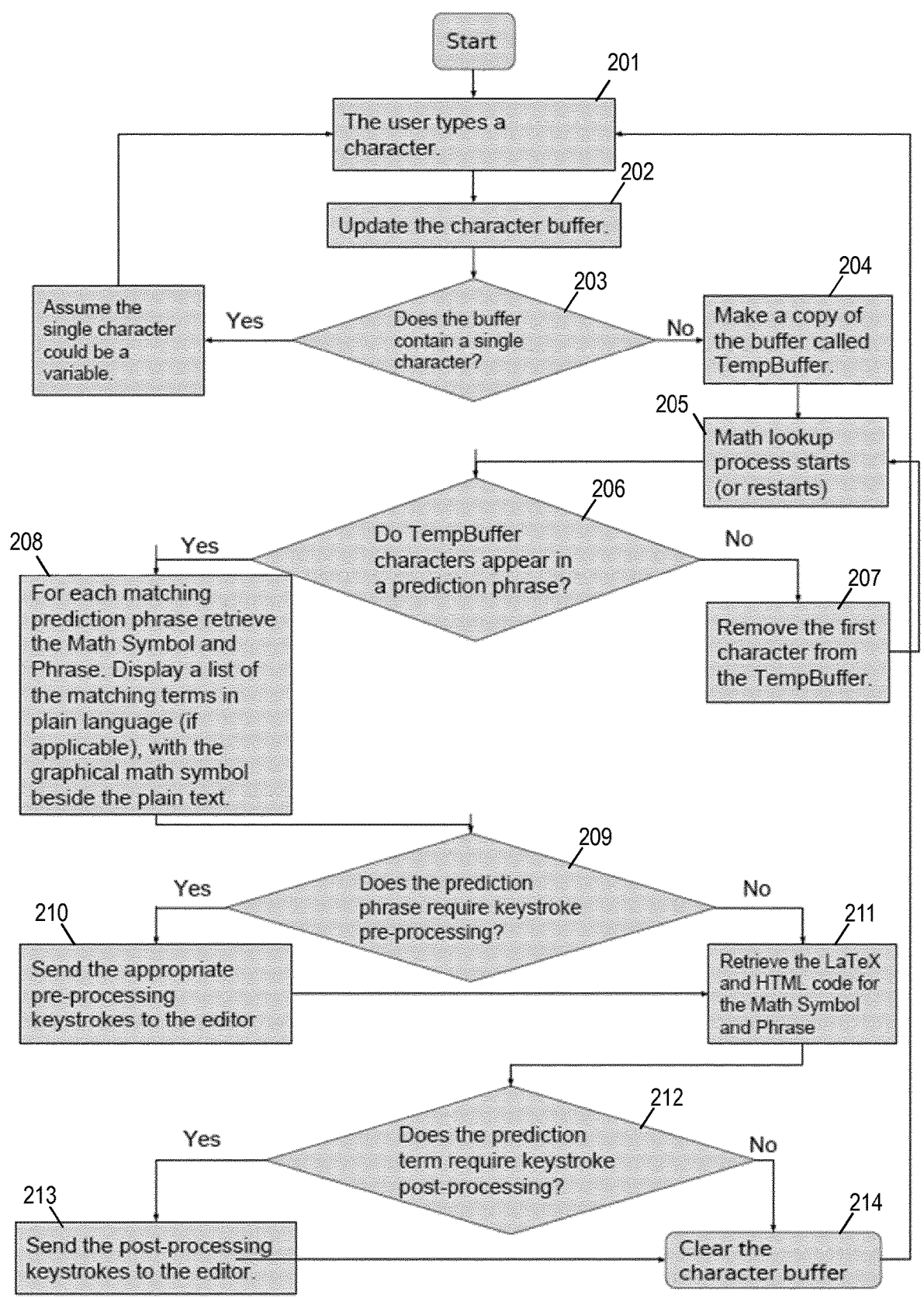
FIG. 2 is a flow chart illustrating the operation of the preferred expression editor.

Referring now to FIG. 2, an exemplary operation of the preferred editor 20 is described in which the user enters a mathematical or scientific expression in a verbalised form using the keyboard 24. At 201, the user makes a keystroke to enter a character of the relevant expression, The first keystroke represents the first character of the expression being entered by the user. Subsequent keystrokes correspond to respective subsequent characters of the expression, At 202 the keystroke is recorded in an input buffer 40 (FIG. 3), i.e. the buffer 40 is updated to include data (e.g. a code) representing the keystroke, and a corresponding character (e.g. a letter, numeral or symbol) is displayed in the entry field 16. At 203, if it is determined that the buffer 40 contains data representing a single character, e.g. letter, numeral or symbol, then control passes back to 201 to await the next keystroke since the single character may represent a variable. In particular this may be true if the single character is a letter and so the editor 20 may be configured to determine if the buffer 40 contains a single letter.

Preferably, each entered character is displayed in the entry field as it is typed by the user. This may result in the display of a string of one or more characters, which may be replaced with a corresponding graphical symbol in the event that a match is found, as described in more detail below.

If the keystroke represents a numeral or a symbol, the corresponding number or symbol may be displayed in the entry field 16. However it is not used for the matching process illustrated in FIG. 2. Therefore, such keystrokes may not be recorded in the input buffer 40. Alternatively, they may be recorded in the input buffer 40 but, at 203, if it is determined that the recorded keystroke represents a numeral or a symbol then control passes back to 201 (and the input buffer 40 is preferably cleared) to await the next keystroke.

If, at 203, the editor 20 determines that the input buffer contains data representing more than one letter, or more than one character, (which typically arises as a result of the user making two (or more) consecutive letter, or character, keystrokes), then the editor 20 makes a copy (204) of the input buffer 40, which in this example is called TempBuffer 42 (overwriting any data that may already be stored in TempBuffer). At 205 the editor 20 begins, or restarts, a matching process based on the contents of TempBuffer 42. At 206 the editor 20 searches the expression library 30 for one or more entries that match the contents of TempBuffer 42. Typically this involves matching the, or each, letter represented in TempBuffer 42 with the data (conveniently the data representing the character string (typically comprising plain text, and in particular letters) that is a verbalisation of the respective mathematical or scientific term for the respective library entry) to find one or more matching data entries. Any conventional matching and/or search algorithm(s) may be used for this purpose.

If, at 206, the editor 20 finds no matches in the library 30, then the first character (which typically represents a letter), i.e. the data representing the first keystroke or whichever character is in first position in the character string recorded in TempBuffer, is removed from TempBuffer 42 (207). Then steps 205 and 206 are repeated for the remaining contents of TempBuffer 42. This accommodates cases where a match was not found because the first letter, or character, represented in TempBuffer 42 was intended to be a variable (which are commonly represented by letters). Accordingly, one or more matches may be found after the first letter is removed. For example, with reference to the example of FIG. 1C, a match is not found at 206 when TempBuffer 42 contains data representing xs, but when x is removed two matches are found for s.

If, at 206, the editor 20 finds one or more matches for the, or each, letter, or character, represented in TempBuffer 42, then the editor 20 displays in the suggestion region 18 the relevant verbalisation of the, or each, predicted matching term, which in the preferred embodiment is accompanied by the corresponding graphical symbol, obtained from the relevant library entry (208). In preferred embodiments, the displayed verbalisation is derived from the phrase data that is part of, or linked with, the relevant library entry. The matching string data could alternatively be used, but using the phrase data is preferable as it allows the editor 20 to support matching of misspelt strings without also having to display misspelt strings.

If the user selects one of the predicted terms presented in the suggestion region 18, then at 209, the editor determines if any pre-processing is required before the corresponding symbol is inserted into the entry field 16. In preferred embodiments, the control flow only moves to 209 when a user selects one of the suggestions in field 18. If the user doesn't make a selection the process may stall until a selection is made or until characters are deleted and new ones entered. If pre-processing is required then the editor performs the relevant operation(s) (210) after which the letters that were used to make the prediction (which are currently stored in the input buffer 40) are removed from the entry field 16 and the relevant graphical symbol, phrase and/or template for the selected term is inserted into the entry field 16 (211), the corresponding data/code having been obtained from the relevant library entry as applicable.

If pre-processing is not required then control passes from 209 to 211. At 212 the editor 20 determines if any post-processing is required after the corresponding symbol has been inserted into the entry field 16. If post-processing is required then the editor 20 performs the relevant operation(s) (213) after which the input buffer 40 is cleared (214). If post-processing is not required then control passes from 212 to 214. Once the input buffer 40 is cleared then the editor 20 awaits the next keystroke.

In preferred embodiments, the process described with reference to FIG. 3 is performed in response to each valid keystroke made by the user, e.g. the editor can begin from step 201 without necessarily returning from steps 214 or 203.

FIG. 3 illustrates an exemplary computer system 50 on which the invention may be embodied. The system 50 comprises a computing device 52, which can be implemented as any form of computer or other electronic device, and in which embodiments of the invention can be implemented.

The computing device 52 comprises one or more processors 54 which may be microprocessors, controllers or any other suitable type of processors for processing computing executable instructions to control the operation of the device 52, including to perform the operations described herein.

The computing device 52 comprises I/O components 56 comprising one or more input interfaces and output interfaces, which may be of any suitable type for receiving data from user input devices such as the keyboard 24, microphone 25 (as applicable) and/or a pointing device (not shown), and for displaying information on display 22, including supporting the user interface 10. The term "component" may refer to any computer related entity such as hardware software and/or firmware.

The computer system 50 may be embodied as a single device (e.g. a computing tablet, smart phone or laptop computer) into which its components are integrated, or two or more separate devices linked by wired or wireless connection(s) (e.g. a desktop PC). In particular the computing device 52 may be integrally formed with, or separate from, either or both of the keyboard 24 and display 22. The keyboard 24 may be any conventional type of keyboard or keypad including a physical keyboard or a virtual keyboard, e.g. provided on a touch screen (e.g. of the display 22) or by projection.

The expression editor 20 may take the form of a computer-program product that includes computer-useable instructions embodied on one or more computer-readable media. The expression editor 24 may be provided, typically as application software, using any computer-readable media, such as memory 58 and is executable by the processor(s) 54. The memory 58 is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computer 52 it will be appreciated that the storage may be distributed or located remotely and accessed via a network or other communication link.

Platform software comprising an operating system or any other suitable platform software can be provided at the computing device 52 to enable application software to be executed on the computer 52.

Conveniently, the memory 58 is used to provide the buffers 40, 42 and the expression library 30. Although shown as one entity, the expression library may be implemented as more than one linked library.

It will be understood that methods embodying the invention may be implemented in software, firmware, hardware, or a combination thereof. In one mode, the method is implemented in software, as one or more executable program, and is executed by one or more special or general purpose 40 digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method as described above. The processor(s) is a hardware device for executing software, particularly software stored in memory. Processor(s) can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s). The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present teaching may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

The invention is not limited to the embodiment(s) described herein but can be amended or modified without departing from the scope of the present invention.

The invention claimed is:

1. A method of creating a mathematical or scientific expression on a computer system, the method comprising:
   providing a user interface on a computer display device, said user interface comprising an expression entry field and a suggestion display region;
   receiving, from a user input device, input data representing a string comprising one or more alphanumeric characters;
   matching said input data with data representing one or more verbalisations of a mathematical or scientific term;
   displaying, in said suggestion display region, a respective representation of at least one matching term;
   identifying a user-selected one of said displayed matching terms; and
   displaying, in said expression entry field, a graphical symbol or other mathematical or scientific notation corresponding to said user-selected term;
   wherein said method further includes:
     in response to receiving said input data, storing said input data in an input buffer;
     making a copy of said input buffer when said input data stored in said input buffer comprises data representing at least two characters, said copy of said input buffer comprising a copy of said input data comprising said data representing at least two characters;
     performing said matching using said copy of said input data from said copy of said input buffer; and
     wherein said matching involves matching said copy of said input data from said copy of said input buffer with said data representing one or more verbalisations of a mathematical or scientific term and, in response to not finding a match for said copy of said input data from said copy of said input buffer, removing from said copy of said input data from said copy of said input buffer and not from said input data in said input buffer data representing a first character of said at least two characters, and then repeating said matching using said copy of said input data from said copy of the input buffer with said data representing said first character removed.

2. The method of claim 1, wherein said respective representation of said at least one matching term comprises a string of alphanumeric characters that provides a verbalisation of the respective matching term.

3. The method of claim 1, wherein said respective representation of said at least one matching term comprises a graphical symbol corresponding to the respective matching term.

4. The method of claim 1, wherein said matching involves matching one or more elements of said input data with said data representing one or more verbalisations of a mathematical or scientific term, wherein the or each input data element represents a letter or other alphanumeric character.

5. The method of claim 1, wherein said data representing one or more verbalisations of a mathematical or scientific term comprises data representing a string of alphanumeric characters.

6. The method of claim 1, wherein said user input device comprises a keyboard and wherein said input data is generated by one or more keystrokes on the keyboard, and wherein said matching is initiated when said input data comprises data representing at least two characters, corresponding to consecutive keystrokes on the keyboard.

7. The method of claim 1, wherein said matching is initiated when said input data comprises data representing at least two characters.

8. The method of claim 1, further including displaying said string in said expression entry field.

9. The method of claim 8, further including removing from said expression entry field the or each character corresponding to the at least one element of the input data matched with said user-selected term.

10. The method of claim 1, wherein said at least two characters are at least two letters.

11. The method of claim 1, wherein said first character is the character of said at least two characters received earliest during said receiving of said input data, and wherein, optionally, said first character is the character of said copied input data stored earliest in said input buffer.

12. The method of claim 1, further including performing at least one pre-processing operations before said displaying, in said expression entry field, a graphical symbol corresponding to said user-selected term, wherein said at least one pre-processing operation involves manipulating a cursor of said expression entry field, and wherein said manipulating said cursor optionally involves any one or more of: raising a level of said cursor; lowering a level of said cursor; moving said cursor forward in said expression field; moving said cursor backward in said expression field.

13. The method of claim 1, further including performing at least one post-processing operations after said displaying, in said expression entry field, a graphical symbol corresponding to said user-selected term, wherein said at least one post-processing operation involves manipulating a cursor of said expression entry field, and wherein said manipulating said cursor optionally involves any one or more of: raising a level of said cursor; lowering a level of said cursor; moving said cursor forward in said expression field; moving said cursor backward in said expression field.

14. The method of claim 1, including clearing said input buffer after identifying said user-selected term.

15. The method of claim 1, wherein said matching involves, in response to not finding a match for said input data, performing one or more transform operations on one or more characters of the input data, and then repeating said matching, and wherein, optionally, performing one or more transform operations involves replacing one or more characters of the input data with one or more other characters, in the string with one or more other characters, and then repeating said matching.

16. The method of claim 1, wherein said matching involves, in response to not finding a match for said input data, performing text prediction on the input data, replacing all or part of said input data with corresponding predicted text data, and then repeating said matching.

17. The method of claim 1, wherein said respective representation of said at least one matching term comprises a template or graphical representation of the respective matching term.

18. The method of claim 1, wherein, displaying, in said expression entry field, a graphical symbol or other mathematical or scientific notation corresponding to said user-selected term, involves displaying a user input template corresponding to said user-selected term.

19. A computing device comprising at least one processor and computer-usable instructions executable by said at least one processor to cause said computing device to perform a method of creating a mathematical or scientific expression on a computer system, the method comprising:
provide a user interface on a computer display device, said user interface comprising an expression entry field and a suggestion display region;
receiving, from a user input device, input data representing a string comprising one or more alphanumeric characters;
matching said input data with data representing one or more verbalisations of a mathematical or scientific term;
displaying, in said suggestion display region, a respective representation of said at least one matching term;
identifying a user-selected one of said displayed matching terms;
displaying, in said expression entry field, a graphical symbol or other mathematical or scientific notation corresponding to said user-selected term, wherein said method further includes;
in response to receiving said input data, storing said input data in an input buffer;
making a copy of said input buffer when said input data stored in said input buffer comprises data representing at least two characters, said copy of said input buffer comprising a copy of said input data comprising said data representing at least two characters;
performing said matching using said copy of said input data from said copy of said input buffer; and
wherein said matching involves matching said copy of said input data from said copy of said input buffer with said data representing one or more verbalisations of a mathematical or scientific term and, in response to not finding a match for said copy of said input data from said copy of said input buffer, removing from said copy of said input data from said copy of said input buffer and not from said input data in said input buffer data representing a first character of said at least two characters, and then repeating said matching using said copy of said input data from said copy of the input buffer with said data representing said first character removed.

* * * * *

UNITED STATES PATENT AND TRADEMARK OFFICE
CERTIFICATE OF CORRECTION

PATENT NO. : 11,501,055 B2
APPLICATION NO. : 16/467230
DATED : November 15, 2022
INVENTOR(S) : Martin McKay et al.

It is certified that error appears in the above-identified patent and that said Letters Patent is hereby corrected as shown below:

On the Title Page

Item (30), change "1620932" to --1620932.2--.

In the Claims

Claim 4, Column 15, Line 10, after "wherein" delete "the or".

Claim 9, Column 15, Line 28, after "field" delete "the or".

Signed and Sealed this
Twenty-eighth Day of March, 2023

Katherine Kelly Vidal
*Director of the United States Patent and Trademark Office*